United States Patent [19]

Tagami et al.

[11] Patent Number: 5,068,562
[45] Date of Patent: Nov. 26, 1991

[54] SMALL STEPPING MOTOR

[75] Inventors: Shigeru Tagami; Yoshio Umedu; Katsuhito Niwa, all of Chiba, Japan

[73] Assignee: Seikosha Co., Ltd., Tokyo, Japan

[21] Appl. No.: 438,557

[22] Filed: Nov. 17, 1989

[30] Foreign Application Priority Data

Jan. 26, 1989 [JP] Japan .................. 63-17044

[51] Int. Cl.⁵ .................. H02K 1/12; H02K 37/00
[52] U.S. Cl. ................... 310/256; 310/40 MM; 310/49 R
[58] Field of Search ............. 310/40 MM, 49 R, 190, 310/256

[56] References Cited

U.S. PATENT DOCUMENTS 4,009,406  2/1977  Inariba .................. 310/164
4,990,806  2/1991  Kikuchi et al. .............. 310/49 A Primary Examiner—Steven L. Stephan
Assistant Examiner—Judson H. Jones
Attorney, Agent, or Firm—Jordan and Hamburg

[57] ABSTRACT

A small stepping motor has a rotor comprised of a rotatably mounted and radially magnetized permanent magnet having a plurality of magnetic poles, a stator having a plurality of magnetic pole portions positioned to face the rotor, a coil wound around the stator, and a driving circuit for controlling the exciting current supplied to the coil. A leakage flux converging member is positioned in the vicinity of the stator so that leakage magnetic flux from the stator or the coil is converged by the leakage flux converging member so as to pass through the stator.

5 Claims, 3 Drawing Sheets

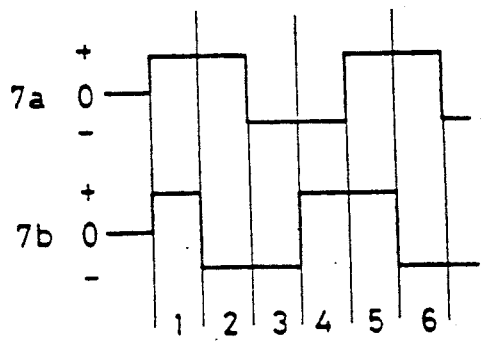
FIG. 2
FIG. 3(a)
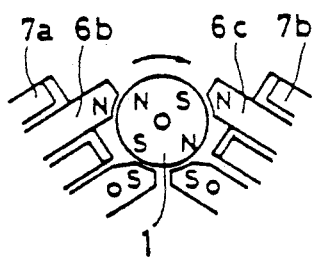
FIG. 3(b)
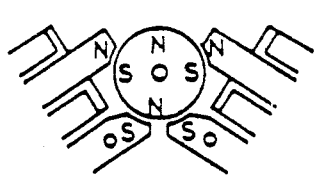
FIG. 3(c)
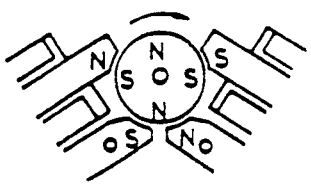
FIG. 3(d)
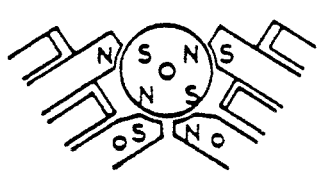
FIG. 3(e)
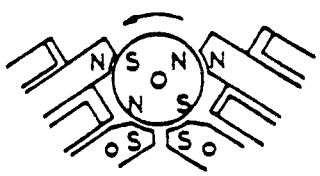
FIG. 3(f)
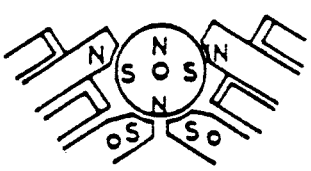

SMALL STEPPING MOTOR

BACKGROUND OF THE INVENTION

1. Field of the Invention

The present invention relates to a small stepping motor which is reversible, that is, the motor shaft can step backward and forward.

2. Description of the Related Art

Stepping motors that are incorporated in small devices, for example, cameras, generally must be highly efficient, low in current consumption and small in size, since batteries are used as power sources therefor. Since reversible stepping motors need at least two sets of coils and stators, those according to the prior art have heretofore been arranged such that the stators and the iron cores are separated from one another or the stators are arranged in planes, one on top of the other.

A typical conventional small stepping motor of the type described above has a rotor comprised of a rotatably mounted and radially magnetized permanent magnet having a plurality of magnetic poles, a stator having a plurality of magnetic pole portions mounted to face the rotor, a coil wound around the stator, and a driving circuit for controlling the exciting current supplied to the coil. In operation, when either a plus (+) or minus (−) exciting current is supplied to the coil in response to an output signal from the driving circuit, magnetic pole portions are formed at the distal end of the stator, thus causing the rotor to rotate.

Thus, in a conventional small stepping motor of the type described above, an exciting current is supplied to the coil to generate magnetic pole portions in the stator, thereby rotating the rotor. In this prior art device, however, magnetic flux leaks out from the stator or the coil. For this reason, the magnetic flux density at the magnetic pole portions of the stator lowers and the magnetic coupling and repulsion forces acting between the magnetic pole portions and the magnetic poles of the rotor decrease, resulting in lowering in the level of rotational force on the rotor. It is therefore necessary, in order to raise the level of rotational force, to increase the exciting current supplied to the coil. This solution produces a rise in the current consumption rate. Accordingly, a battery of relatively large capacity must be incorporated into a small stepping motor, contrary to the above-described requirements for reduction in the over-all size and thickness of small stepping motors.

SUMMARY OF THE INVENTION

In view of these circumstances, it is a primary object of the present invention to provide a novel small stepping motor which is free from the above-described problems of the prior art devices.

For this purpose, the present invention provides a small stepping motor having a rotor comprised of a rotatably mounted and radially magnetized permanent magnet having a plurality of magnetic poles, a stator having a plurality of magnetic pole portions positioned to face the rotor, a coil wound around the stator, and a driving circuit for controlling the exciting current supplied to the coil. In accordance with the invention, a leakage flux converging member is positioned in the vicinity of the stator so that leakage magnetic flux from the stator or the coil is converged by the leakage flux converging member so as to pass through the stator.

Since a leakage flux converging member is positioned in the vicinity of the stator, most of the magnetic flux leaking out from the stator or the coil is converged by the leakage flux converging member so as to pass through the stator again. Therefore, the magnetic flux density at the magnetic pole portions of the stator rises and the magnetic coupling and repulsion forces acting between the magnetic pole portions and the magnetic poles of the rotor increase, so that the rotational force on the rotor increases. In other words, the coil needs a relatively small exciting current to obtain the same level of rotational force from the rotor and it is therefore possible to reduce the current consumption rate.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIG. 2 is a waveform chart showing output signals from a driving circuit for driving the stepping motor of the present invention;

FIGS. 3(a) to 3(f) show the operation of the motor according to one embodiment.

DESCRIPTION OF THE PREFERRED EMBODIMENT

One embodiment of the present invention will be described below in detail with reference to the accompanying drawings. FIGS. 1 to 4 show, in combination, one embodiment of the small stepping motor according to the present invention.

Figure 1:
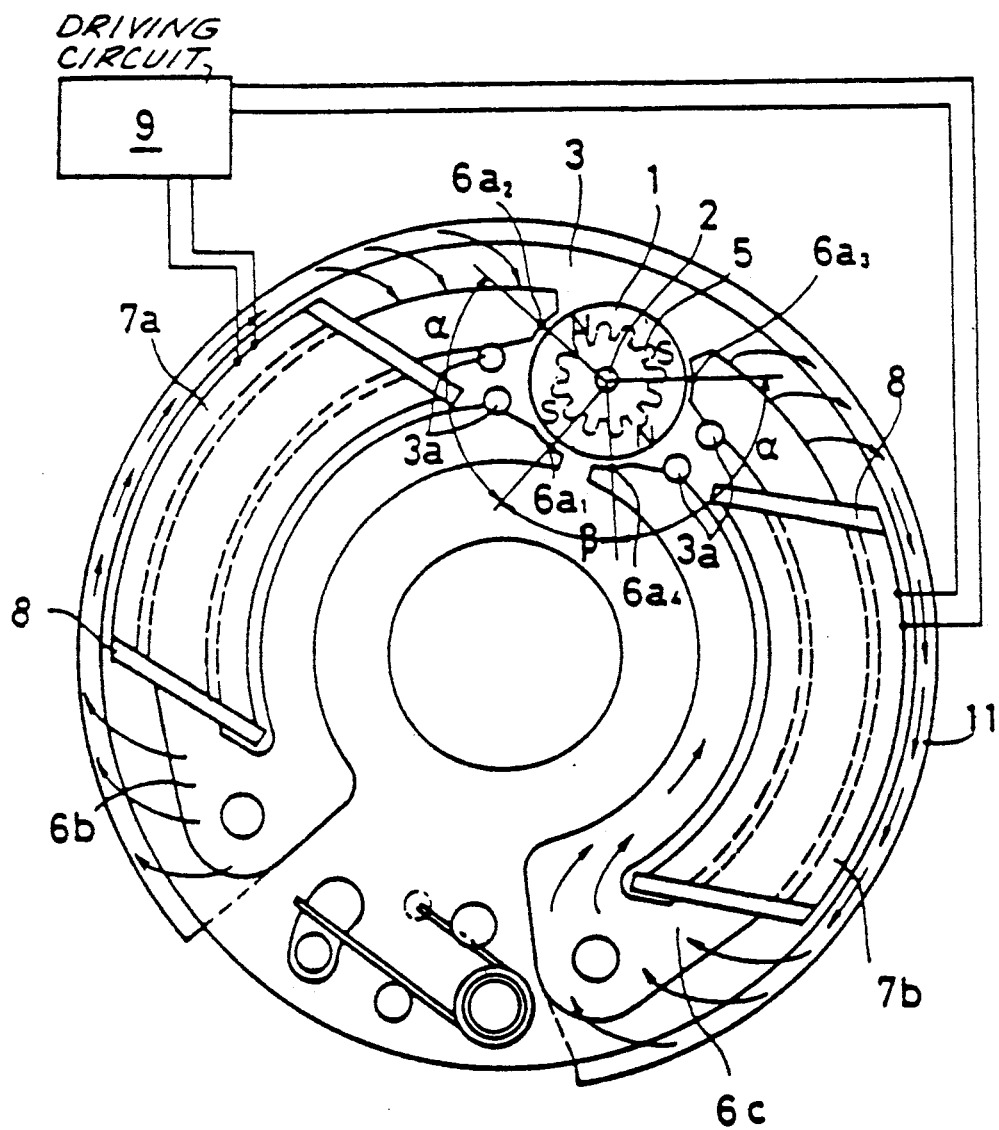
FIG. 1 is a plan view of one embodiment of the small stepping motor according to the present invention.

Referring first to FIG. 1, a rotor 1 is comprised of a permanent magnet (e.g., rare-earth magnet) radially magnetized so as to have four magnetic poles. The rotor 1 is rigidly secured to a rotor shaft 2 to form a single unit. One end of the rotor shaft 2 is rotatably supported in a bore provided in a disk-shaped lower plate 3, while the other end of the rotor shaft 2 is rotatably supported in a bore provided in an upper plate (located above the rotor as viewed in FIG. 1, although not shown in this Figure). The first end of the rotor shaft 2 extends through the bore in the lower plate 3, and a rotor pinion 5 for transmitting the rotation of the rotor 1 to a gear train (not shown) is rigidly secured to the projecting distal end of the rotor shaft 2.

The reference numeral 6b denotes a stator made of a magnetic material (e.g., pure iron) which has a pair of leg portions so as to define a U-shaped configuration. The leg portions have magnetic pole portions $6a_1$ and $6a_2$ at the distal ends, respectively, so that the pole portions $6a_1$ and $6a_2$ face the outer periphery of the rotor 1. When the rotor 1 is in the position shown in FIG. 1, the magnetic pole portions $6a_1$ and $6a_2$ are disposed at respective positions which are below (as viewed in the Figure) the corresponding S and N poles which are on the left-hand side of the rotor 1. Another stator 6c, which has the same configuration as that of the stator 6b, is disposed in line symmetry with the stator 6b. The stator 6c has magnetic pole portions $6a_3$ and $6a_4$, which are similarly disposed at respective positions below (as viewed in the Figure) the corresponding S and N poles on the right-hand side of the rotor 1. The two stators 6b and 6c have a circular configuration and are disposed in the same plane so that they do not overlap each other. The stators 6b and 6c are positioned by guide pins 3a provided on the lower plate 3. As a consequence, the stators 6b and 6c are disposed so that the magnetic pole portions $6a_1$ and $6a_4$ are in close proximity to one another in the same plane.

It is assumed that the angle between each of the pairs of magnetic pole portions $6a_1$, $6a_2$ and $6a_3$, $6a_4$ with respect to the center of rotation of the rotor 1 is $\alpha$, while the angle that is made between the magnetic pole portions $6a_1$ and $6a_4$, which are adjacent to each other, with respect to the center of rotation of the rotor 1, is $\beta$. These magnetic pole portions $6a_1$, $6a_2$, $6a_3$ and $6a_4$ are disposed so that the relations $\beta < 90°$ and $180° < 2\alpha + \beta < 270°$ are satisfied. In the arrangement shown in FIG. 1, $\beta = 45°$ and $\beta = 90°$, as one example of the positional relationship between the magnetic pole portions $6a_1$, $6a_2 6a_3$ and $6a_4$ mounted to satisfy the abovedescribed relations.

A substantially plate-shaped leakage flux converging member 11 which is made of a magnetic material (e.g., pure iron, Fe-Si alloy, etc.) is provided along the peripheral edge portion of the disk-shaped lower plate 3 and in the vicinity of the stators 6b and 6c. The member 11 is designed to converge the magnetic flux leaking from the stators 6b and 6c. For this purpose, the leakage flux converging member 11 is disposed so as to extend from the proximal end (the lower end as viewed in FIG. 1) of the of the stator 6b to the distal end of the magnetic pole portion $6a_2$ and further extend continuously from the distal end of the magnetic pole portion $6a_3$ of the stator 6c to the proximal end (the lower end as viewed in FIG. 1) of the stator 6c.

Two coils 7a and 7b for generating magnetic fields at the magnetic pole portions $6a_1$, $6a_2$ and $6a_3$, $6a_4$ of the two stators 6b and 6c are connected to a driving circuit 9 that will be described later. The coils 7a and 7b are wound around respective coil forms 8 and fitted on the respective leg portions of the stators 6b and 6c.

FIG. 2 shows output signals from the driving circuit 9 for energizing the coils 7a and 7b to generate a predetermined magnetic field at each of the magnetic pole portions $6a_1$, $6a_2$, $6a_3$ and $6a_4$ of the stators 6b and 6c. The illustrated signals are output signals of a known bipolar-driven two-phase excitation-type driving circuit in which the coil exciting current is supplied in either of two directions, that is, plus (+) and minus (−) directions, and the two coils are constantly supplied with the exciting currents, respectively.

The following is a description of the operation of the foregoing arrangement.

First, when the two coils 7a and 7b are not energized, there are statically stable points where the rotor 1 stops in the balance of magnetic forces at each angle (90°) corresponding to one quarter of one full turn of the rotor 1 due to the magnetic coupling force acting between the four magnetic pole portions $6a_1$, $6a_2$, and $6a_3$, $6a_4$ of the two stators 6b and 6c and the two pairs of N and S poles, i.e., a total of four magnetic poles, and by virtue of the above-described phase relationship between these magnetic pole portions and the N and S poles.

More specifically, the two pairs of magnetic pole portions $6a_1$, $6a_2$ and $6a_3$, $6a_4$ of the stators 6b and 6c which are disposed so as to face the four magnetic poles, respectively, of the rotor 1 are magnetized by the magnetic forces from the four magnetic poles of the rotor 1 so that the magnetic pole portions $6a_1$, $6a_2$, $6a_3$ and $6a_4$ have magnetic poles which are opposite to those of the corresponding magnetic poles. Therefore, the rotor 1 has a static stable point at each angle (90°) corresponding to one quarter of one full turn of the rotor 1.

For instance, it is assumed that the rotor 1 is at rest with the positional relationship shown in FIG. 1. If, in this state, the coils 7a and 7b are energized in response to respective symmetric output signals from the driving circuit 9 so that magnetic fields are generated at the magnetic pole portions $6a_1$, $6a_2$, $6a_3$ and $6a_4$ of the stators as shown in FIG. 3(a), the rotor 1 rotates one-eighth turn (45°) in the clockwise direction and stops at the position shown in FIG. 3(b).

Next, the direction of the current supplied to the coil 7b is inverted. As a consequence, the magnetic poles of the stator 6c on the coil (7b) side are inverted, so that magnetic fields are generated at the magnetic pole portions $6a_3$ and $6a_4$ as shown in FIG. 3(c). As a result, the rotor 1 further rotates one-eighth turn in the clockwise direction and stops at the position shown in FIG. 3(d). Thereafter, every time the two coils 7a and 7b are alternately supplied with inverted currents, the magnetic poles of either one of the two stators are inverted, so that the rotor 1 continues to rotate stepwise in the clockwise direction.

If, in the state shown in FIG. 3(d), the coils 7a and 7b are energized so that magnetic fields are generated at the magnetic pole portions 6a and $6a_4$ as shown in FIG. 3(e), the rotor 1 rotates one-eighth turn in the counterclockwise direction and stops at the position shown in FIG. 3(f). If, in this state, the magnetic poles of the stator 6b on the coil (7a) side are inverted, the rotor 1 further rotates one-eighth turn in the counterclockwise direction and stops. Thus, every time the coils 7a and 7b are alternately supplied with inverted currents, the rotor 1 continues to rotate counterclockwise in the same way as in the foregoing clockwise rotation. Accordingly, the rotation of the rotor 1 is reversibly controlled in response to the output signals from the driving circuit 9, and the rotation of the rotor 1 is transmitted to the gear train (not shown) through the rotor pinion 5 rigidly secured to the distal end of the rotor shaft 2.

Figure 4:
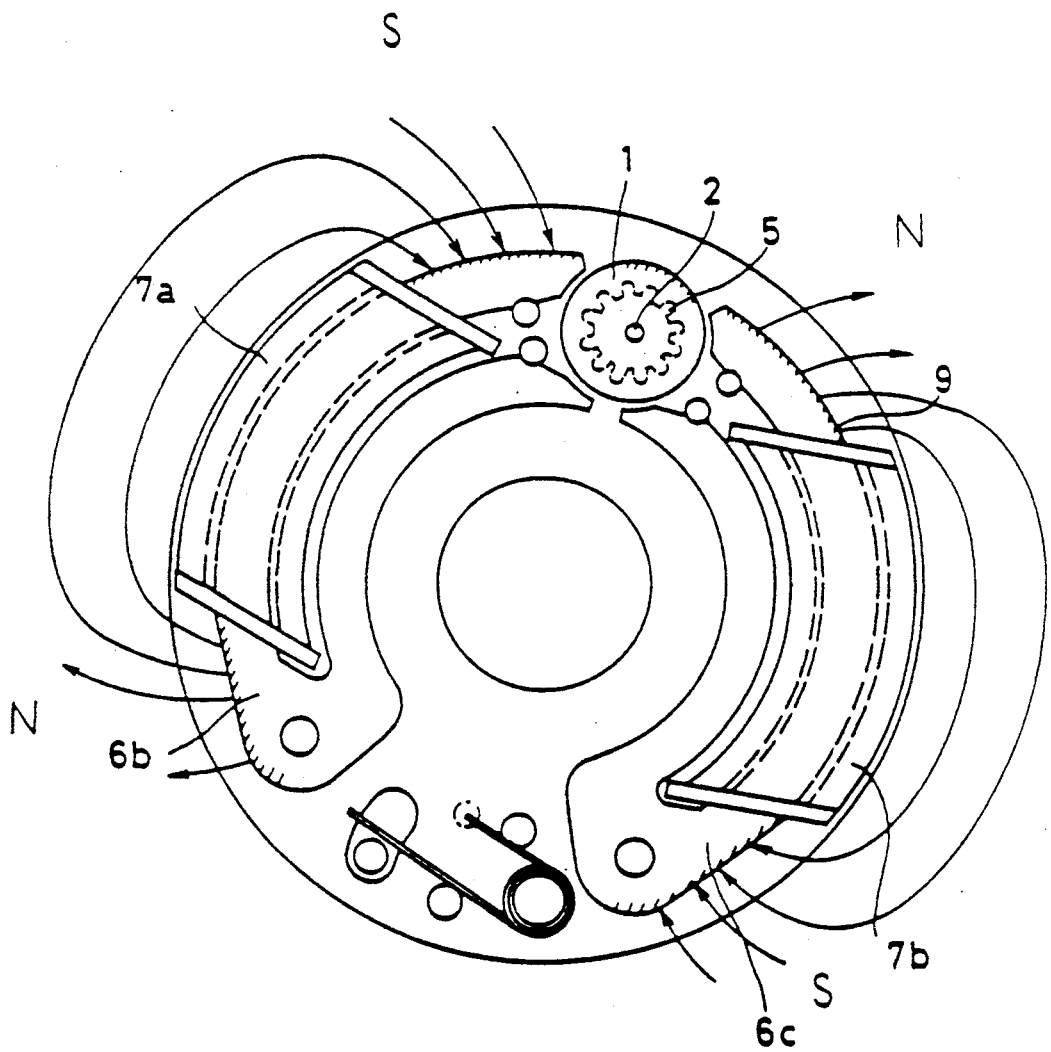
FIG. 4 is a plan view of a small stepping motor which has no leakage flux converging member.

Let us assume that a leakage flux converging member 11 is not provided along the peripheral edge portion of the lower plate 3 and in the vicinity of the stators 6b and 6c, as shown in FIG. 4. If, in this arrangement, the coils 7a and 7b are supplied with exciting current, magnetic flux passes through the stators 6b and 6c. As a consequence, N and S poles are generated at the proximal and distal ends, respectively, of the stator 6b, while S and N poles are generated at the proximal and distal ends, respectively, of the stator 6c, as exemplary shown in the Figure. Incidentally, the magnetic reluctance of air, a magnetic insulator, for the stators 6b and 6c is no more than $10^2$ to $10^4$ times that of iron. For this reason, a part of the magnetic flux does not pass through the stators 6b and 6c but leaks out, as shown in the Figure. If such leakage magnetic flux is generated from the stators 6b, 6c and the coils 7a, 7b, the magnetic flux density at the magnetic pole portions $6a_1$, $6a_2$, $6a_3$ and $6a_4$ lowers, which results in lowering in the magnetic coupling and repulsion forces acting between the magnetic pole portions $6a_1$, $6a_2$, $6a_3$ and $6a_4$ and the magnetic poles of the rotor 1.

In the present invention, however, the leakage flux converging member 11 is provided in the vicinity of the stators 6b and 6c, as shown in FIG. 1. Therefore, most of the magnetic flux leaking out from the stators $6b$, $6c$ and the coils $7a$, $7b$ is converged by the leakage flux converging member 11 so as to pass through the stators $6b$ and $6c$ again. Thus, since the leakage magnetic flux converges to pass through the stators $6b$ and $6c$, the magnetic flux density at the magnetic pole portions $6a_1$, $6a_2$, $6a_3$ and $6a_4$ rises and the magnetic coupling and repulsion forces acting between the magnetic pole portions $6a_1$, $6a_2$, $6a_3$ and $6a_4$ and the magnetic poles of the rotor 1 increase, so that the level of rotational force of the rotor 1 rises. In other words, the coils $7a$ and $7b$ need a relatively small exciting current to obtain the same level of rotational force from the rotor 1 and it is therefore possible to reduce the current consumption rate. Accordingly, it is possible to incorporate a battery of relatively small capacity into the small stepping motor and it is hence possible to further reduce the over-all size and thickness of the stepping motor.

Although the foregoing embodiment shows the most efficient form, it should be noted that it is also possible within the technical scope of the present invention to further extend the leakage flux converging member to a closed loop which includes only one of the stators and its associated coil, or provide the leakage flux converging member so as to extend over each stator or coil from a position near the rotor.

If the lower plate 3 and the upper plate are formed by injection molding using a plastic material (e.g., a polyacetal resin or the like) which is superior in terms of frictional wear resistance, mechanical strength and long-term stability, it is possible not only to reduce the number of constituent parts by a large margin but also to form a stepping motor which has excellent assemble ability and which is superior from the economical point of view.

As has been described above, according to the present invention, a leakage flux converging member is positioned in the vicinity of a stator so that leakage magnetic flux from the stator and the stator coil is converged by the leakage flux converging member so as to pass through the stator. Therefore, the magnetic flux density at the magnetic pole portions of the stator rises and the magnetic coupling and repulsion forces acting between the magnetic pole portions $6a_1$, $6a_2$, $6a_3$ and $6a_4$ and the magnetic poles of the rotor 1 increase, so that the level of rotational force of the rotor 1 rises. In other words, the coils $7a$ and $7b$ need a relatively small exciting current to obtain the same level of rotational force from the rotor 1 and it is therefore possible to reduce the current consumption rate. Accordingly, it is possible to incorporate a battery of relatively small capacity into the small stepping motor and it is hence possible to further reduce the over-all size and thickness of the stepping motor.

In addition, the leakage flux converging member also functions as an interpole in the vicinity of the rotor, thus enabling the rotor to rotate even more smoothly.

Although the present invention has been described through specific terms, it should be noted here that the described embodiment is not necessarily exclusive and that various changes and modifications may be imparted thereto without departing from the scope of the invention, which is limited solely by the appended claims.

What I claim is:

1. In a small stepping motor having a rotor comprised of a rotatably mounted and radially magnetized permanent magnet having a plurality of magnetic poles, a stator having a plurality of magnetic pole portions positioned to face said rotor, a coil wound around said stator, and a driving circuit for controlling the exciting current supplied to said coil, the improvement comprising a leakage flux converging member located in the vicinity of said stator at a position to converge leakage magnetic flux from said stator or said coil to pass through said stator, said stator being comprised of at least one U-shaped magnetic member having a pair of arcuate pole portions joined at a proximal end thereof and having distal ends facing said rotor, said converging member extending at least from a position adjacent said proximal end to a position adjacent said distal end.

2. The stepping motor of claim 1 wherein said stator is mounted on a generally circular plate, said converging member being arcuate and extending along the periphery of said plate.

3. A stepping motor having a rotor comprised of a radially magnetized permanent magnet, a mounting plate, said rotor being rotatably mounted to said plate, a stator having a pair of arcuate poles joined at one end, said stator being mounted to said plate with the unjoined poles thereof facing said rotor, a winding on said stator, and a leakage flux converging member mounted adjacent said stator to converge leakage magnetic flux from said stator or coil to pass through said stator.

4. The stepping motor of claim 3 wherein said mounting plate is circular and said converging member is arcuate and extends around at least a portion of the periphery of said plate.

5. A stepping motor having a rotor comprised of a radially magnetized permanent magnet, a circular mounting plate, said rotor being rotatably mounted to said plate, a stator comprised of a pair of U-shaped members each comprised of a pair of arcuate poles joined at first ends thereof and having poles at the other end facing said rotor, said U-shaped members being mounted to said plate with the poles generally concentric therewith, whereby the pole ends of the U-shaped members face opposite sides of the rotor, coil means on said stator, and a leakage flux converging member extending around at least a portion of the periphery of said plate to converge leakage magnetic flux from said stator and coil means to pass through said stator.

* * * * *